(12) United States Patent
Masaoka et al.

(10) Patent No.: US 11,512,773 B2
(45) Date of Patent: Nov. 29, 2022

(54) DIAL SELECTOR UNIT WITH A PANEL HAVING A CONCAVE SURFACE

(71) Applicants: Toyota Jidosha Kabushiki Kaisha, Toyota Aichi-ken (JP); Subaru Corporation, Shibuya-ku Tokyo (JP)

(72) Inventors: Kazunori Masaoka, Toyota Aichi-ken (JP); Naoki Yamada, Toyota Aichi-ken (JP); Junya Ono, Toyota Aichi-ken (JP); Naofumi Ota, Shibuya-ku Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/404,340

(22) Filed: Aug. 17, 2021

(65) Prior Publication Data
US 2022/0090674 A1    Mar. 24, 2022

(30) Foreign Application Priority Data
Sep. 23, 2020    (JP) .............................. JP2020-158459

(51) Int. Cl.
*F16H 59/08*    (2006.01)

(52) U.S. Cl.
CPC ....... *F16H 59/08* (2013.01); *F16H 2059/081* (2013.01)

(58) Field of Classification Search
CPC .... F16H 59/08; F16H 59/12; F16H 2059/081; G05G 1/087; G05G 1/08; G05G 1/082; G05G 1/10
(Continued)

(56) References Cited

U.S. PATENT DOCUMENTS 6,378,393 B1 *    4/2002    Bates ..................... F16H 59/02
                                                                    74/473.18
2002/0152828 A1 *  10/2002  Nagasaka ............... F16H 59/12
                                                                    74/473.23
(Continued)

FOREIGN PATENT DOCUMENTS

DE    102007029594 A1 *   1/2009   ............. B60K 37/06
EP       3217533 A1 *    9/2017   ............. H02P 6/085
(Continued)

OTHER PUBLICATIONS

U.S. Appl. No. 17/222,615, filed Apr. 5, 2021; Ono, Hiroki et al.

*Primary Examiner* — Jake Cook
*Assistant Examiner* — T. Scott Fix
(74) *Attorney, Agent, or Firm* — Dinsmore & Shohl LLP

(57) ABSTRACT

A selector unit includes a panel, and a dial member that protrudes in a first direction from an opening of the panel. A surface of the panel includes a concave surface having a depth that increases toward the opening. The dial member has an operation portion gripped by a user, and a base shaft portion that extends from the operation portion through the opening of the panel. At least a part of an outer circumferential surface of the base shaft portion is an inclined surface that is inclined radially outward as being away from the panel, and the inclined surface is opposed to the surface of the panel in the first direction. The distance from the surface of the panel to the inclined surface of the dial member in the first direction continuously increases, as a radial distance from the opening to the inclined surface increases.

7 Claims, 3 Drawing Sheets

(58) Field of Classification Search
USPC ........................................................ 74/473.3
See application file for complete search history.

(56) References Cited

U.S. PATENT DOCUMENTS

| | | | | |
|---|---|---|---|---|
| 2003/0016136 A1* | 1/2003 | Harvey | .................. | H03K 17/94 |
| | | | | 340/572.1 |
| 2006/0037424 A1* | 2/2006 | Pickering | ................ | F16H 59/08 |
| | | | | 74/473.3 |
| 2014/0345409 A1* | 11/2014 | Watanabe | ............... | F16H 59/08 |
| | | | | 74/473.3 |
| 2018/0172145 A1* | 6/2018 | Farges | .................... | F16H 59/10 |

FOREIGN PATENT DOCUMENTS

| | | | | | |
|---|---|---|---|---|---|
| GB | 2444502 A | * | 6/2008 | ............ | B60K 20/02 |
| JP | 2012086828 A | | 5/2012 | | |

* cited by examiner

DIAL SELECTOR UNIT WITH A PANEL HAVING A CONCAVE SURFACE

CROSS-REFERENCE TO RELATED APPLICATION

This application claims priority to Japanese Patent Application No. 2020-158459 filed on Sep. 23, 2020, incorporated herein by reference in its entirety.

BACKGROUND

1. Technical Field

The technology disclosed in this specification relates to a dial (i.e., rotating) selector unit that is operated by a user.

2. Description of Related Art

A dial selector unit is disclosed in Japanese Unexamined Patent Application Publication No. 2012-086828 (JP 2012-086828 A). The selector unit is used for a vehicle, and includes a panel having an opening, and a dial member that protrudes from the opening of the panel. The user can change the traveling direction (namely, forward or backward) of the vehicle, by operating the dial member.

SUMMARY

If the amount of protrusion of the dial member relative to the panel is too large, a person or a thing may accidentally contact with the dial member. On the other hand, if the amount of protrusion of the dial member relative to the panel is too small, the user has a difficulty in gripping the dial member, and the operability of the selector unit may deteriorate. To deal with the conflicting problems, it may be considered to locally form a concave surface of the panel located adjacent to the dial member. With this arrangement, it is possible to prevent the panel from interfering with a finger or hand of the user when the user grips the dial member, while holding down the substantial amount of protrusion of the dial member relative to the panel.

However, when the panel has a concave surface adjacent to the dial member, and foreign objects are present on the panel, the foreign objects are likely to gather toward the dial member, and operation of the dial member may be disturbed by the foreign objects. In particular, a typical type of the dial member is operated to be rotated while it is pushed in toward the panel. In this type of dial member, space needs to be provided between the panel and the dial member, and a foreign object that moves toward the dial member may enter the space. In this case, when the dial member is pushed in toward the panel, the foreign object may be caught between the dial member and the panel, and operation of the dial member may be disturbed.

This specification provides a technology for use in a dial selector unit, which makes it less likely or unlikely that operation of a dial member is disturbed by a foreign object.

According to the technology disclosed in the specification, a selector unit of a dial type includes a panel having an opening, and a dial member that protrudes in a first direction from the opening of the panel, and is configured to be rotated about a rotation axis parallel to the first direction, in a condition where the dial member is pushed in toward the panel. A surface of the panel includes a concave surface having a depth that increases toward the opening. The dial member has an operation portion configured to be gripped by a user, and a base shaft portion that extends from the operation portion through the opening of the panel, and the operation portion has a larger radial dimension than the base shaft portion. At least a part of an outer circumferential surface of the base shaft portion is an inclined surface that is inclined radially outward as being away from the panel, and the inclined surface is opposed to the surface of the panel in the first direction. A distance from the surface of the panel to the inclined surface of the dial member in the first direction continuously increases, as a radial distance from the opening to the inclined surface increases.

In the selector unit as described above, the panel locally has a concave surface adjacent to the dial member. This arrangement makes it easier for the user to operate the dial member, namely, enhances the operability of the dial member, while holding down the substantial amount of protrusion of the dial member relative to the panel. Meanwhile, foreign objects on the panel are likely to gather toward the dial member, and any of the foreign objects is more likely to enter space between the dial member and the panel. In this respect, the outer circumferential surface of the dial member includes the inclined surface that is inclined radially outward as being away from the panel, and the inclined surface is opposed to the surface of the panel in the first direction (namely, in the direction in which the dial member is pushed in). Then, the distance from the surface of the panel to the inclined surface of the dial member in the first direction continuously increases as the radial distance from the opening increases. With this arrangement, when the dial member is pushed in toward the panel, any foreign object present between the inclined surface of the dial member and the surface of the panel can be pushed out by the inclined surface. Thus, operation of the dial member can be substantially prevented from being disturbed by foreign objects.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one form of this technology, an angle formed by the surface of the panel and the inclined surface of the dial member may change continuously or in steps, in a circumferential direction about the rotation axis. Namely, the angle formed by the surface of the panel and the inclined surface of the dial member may be different between at least two locations in the circumferential direction. In this connection, as the angle formed by the surface of the panel and the inclined surface of the dial member is larger, the force with which the inclined surface pushes out a foreign object, namely, the force applied radially outward from the inclined surface to the foreign object, becomes larger. Thus, when there is a location where foreign objects are relatively likely to gather, though the location is not particularly limited, it is effective to locally increase the angle formed by the surface of the panel and the inclined surface of the dial member, at this location.

In one form of the technology, the selector unit may further include a biasing member that biases the dial member in a direction away from the panel. With this arrangement, the user can easily perform operation to push in the dial member little by little, or can easily make subtle adjustment of the force with which the dial member is pushed in. Thus, the user can more reliably remove foreign objects present between the dial member and the panel.

In one form of the technology, the dial member may be configured to be operable in the first direction, between a locked position, and an unlocked position that is displaced from the locked position toward the panel. In this case, when the dial member is in the locked position, the dial member may be inhibited from rotating about the rotation axis. With this arrangement, the dial member can be prevented from being erroneously operated.

In one form of the technology, the selector unit may be used for a vehicle. In this case, the panel may be located so as to provide a part of the interior of the vehicle. Namely, the selector unit may be placed in the interior (cabin) of the vehicle, and may be operated by a driver of the vehicle or another passenger. In one example, the selector unit may be used for changing the traveling direction (forward or backward) of the vehicle, when it is operated by the driver.

Figure 1:
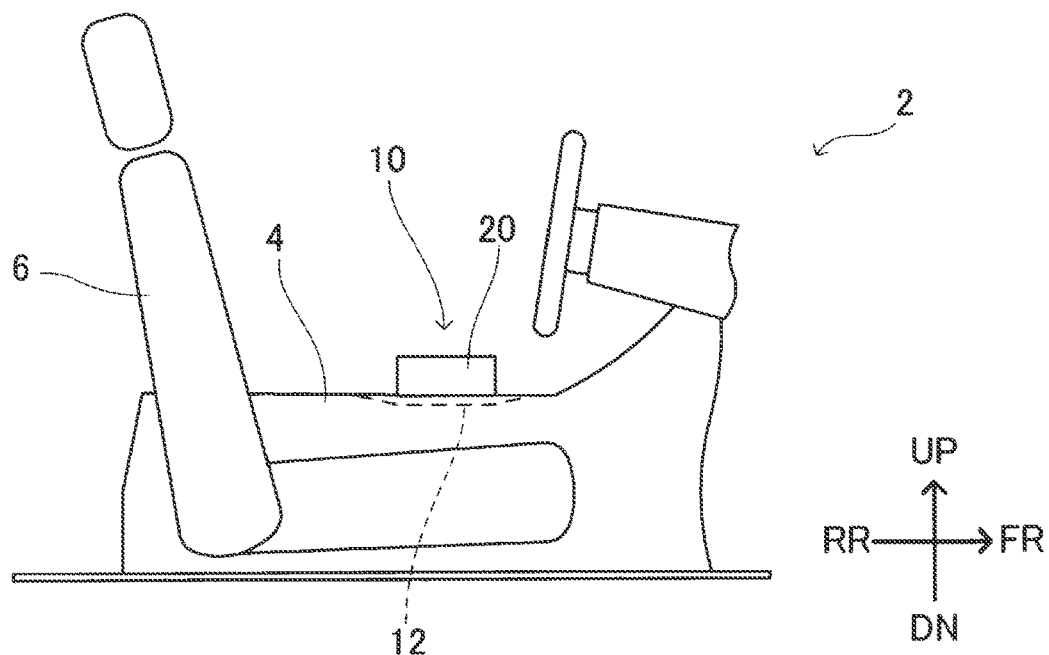
FIG. 1 is a view showing a vehicle in which a selector unit of one embodiment is used.

Referring to the drawings, a selector unit 10 of one embodiment will be described. The selector unit 10 of this embodiment is an operation unit adapted to be operated by a user, and, in particular, a dial (rotating) selector unit. As shown in FIG. 1, the selector unit 10 can be used for a vehicle 2, though it is not limited to any particular use. In the drawings, direction FR indicates the front side in the front-rear direction (vehicle longitudinal direction) of the vehicle 2, and direction RR indicates the rear side in the front-rear direction of the vehicle 2. Also, direction LH indicates the left-hand side in the lateral direction (vehicle width direction) of the vehicle 2, and direction RH indicates the right-hand side in the lateral direction of the vehicle 2. Then, direction UP indicates the upper side in the vertical direction (vehicle height direction) of the vehicle 2, and direction DN indicates the lower side in the vertical direction of the vehicle 2. In this specification, the longitudinal direction, lateral direction, and vertical direction of the vehicle 2 may be simply referred to as the longitudinal direction, lateral direction, and vertical direction, respectively.

The selector unit 10 is provided on a center console 4 of the vehicle 2, and is located at a position where the selector unit 10 can be operated by a hand of a driver (not shown) seated on a driver seat 6. The driver can change a direction (namely, forward or backward) in which the vehicle 2 travels, for example, by operating the selector unit 10. In this embodiment, the vehicle 2 is an automobile that travels on a road, and may be selected from various types of vehicles, such as an engine vehicle, electric vehicle, hybrid vehicle, and fuel cell vehicle. It is, however, to be noted that the selector unit 10 of this embodiment is not limitedly used for an automobile or other type of vehicle, but may be similarly employed in various devices.

Figure 2:
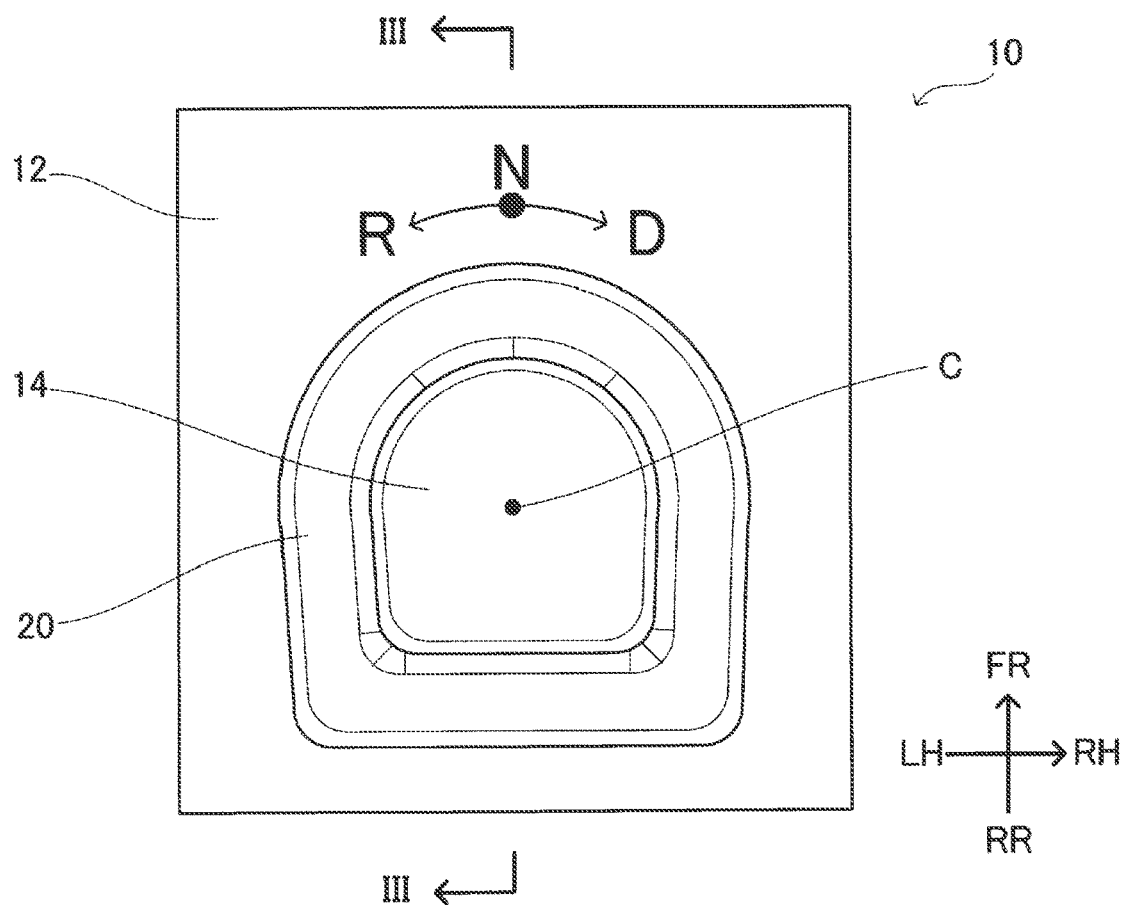
FIG. 2 is a plan view showing the selector unit.
Figure 3:
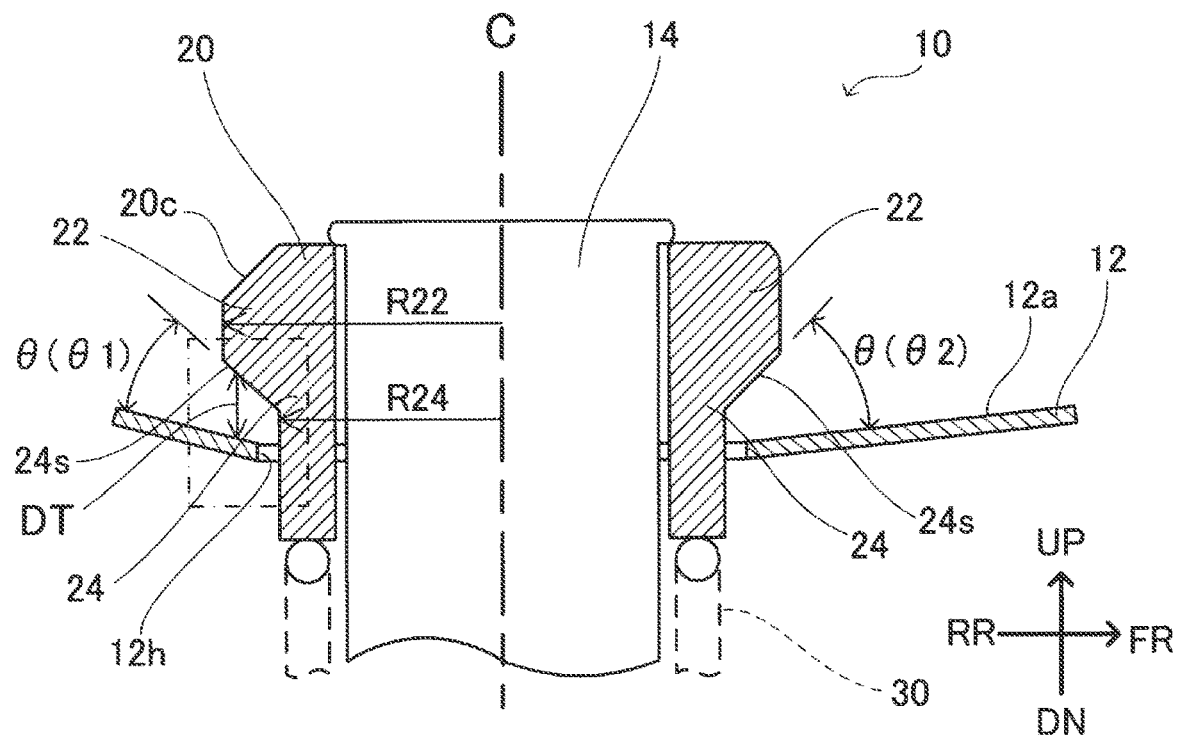
FIG. 3 is a cross-sectional view taken along line in FIG. 2, showing a dial member that is in a locked position.
Figure 4:
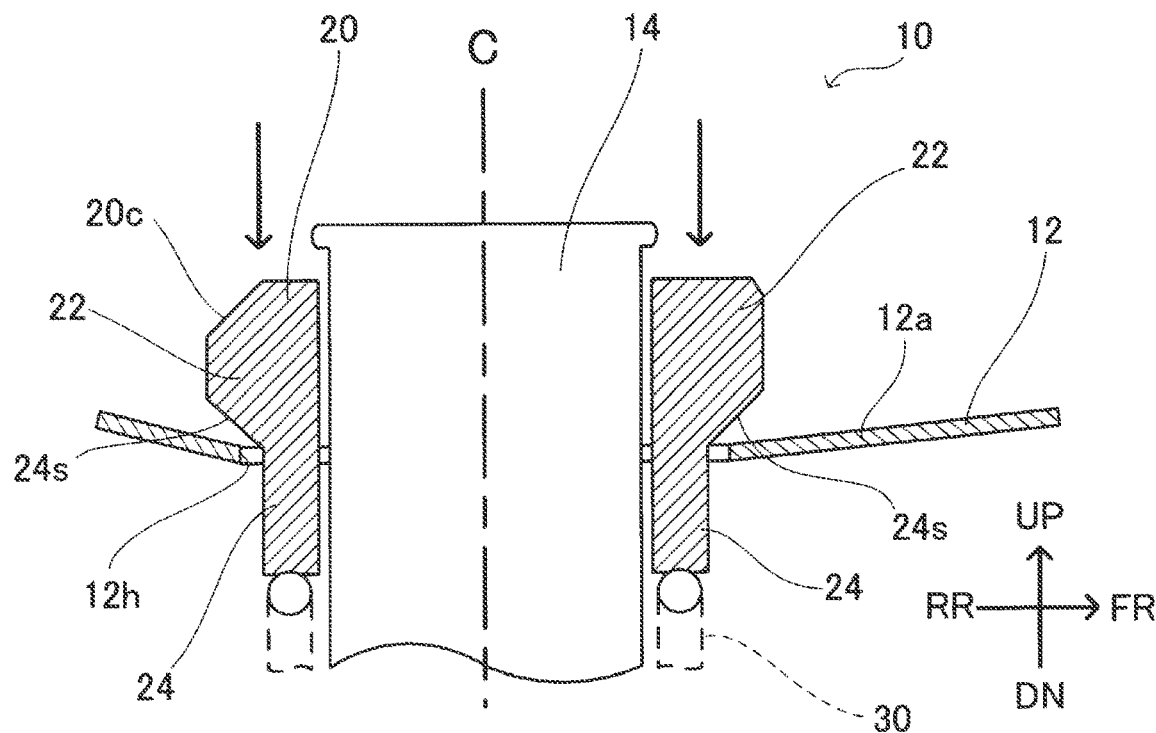
FIG. 4 is a cross-sectional view taken in the same position as FIG. 3, showing the dial member that is in an unlocked position.

As shown in FIG. 2 to FIG. 4, the selector unit 10 mainly includes a panel 12, center shaft 14, dial member 20, and biasing member 30. The panel 12 is a plate-like member, and provides a part of the interior of the vehicle 2 (more specifically, a part of the upper surface of the center console 4). The panel 12 of this embodiment is formed of a resin material, though it is not limited to any particular material. The panel 12 is provided with an opening 12h for the dial member 20. The panel 12 has a concave surface 12a of which the depth increases toward the opening 12h.

The dial member 20 protrudes in a first direction from the opening 12h of the panel 12, along with the center shaft 14. The first direction in this embodiment is the same as the vertical direction of the vehicle 2, but is not limited to this. The direction in which the dial member 20 protrudes, namely, the orientation or attitude of the selector unit 10, may be changed as needed. The dial member 20 is supported by the center shaft 14, and can be moved along the center shaft 14, between a locked position shown in FIG. 3 and an unlocked position shown in FIG. 4. Also, the dial member 20 is biased toward the locked position, by a biasing member 30. Thus, the dial member 20 is normally placed in the locked position to be spaced apart from the panel 12. When the user pushes the dial member 20 toward the panel 12, the dial member 20 moves from the locked position to the unlocked position. The biasing member 30 may be a coil spring, for example, though it is not particularly limited.

The dial member 20 is allowed to rotate about the rotation axis C when it is in the unlocked position, and is inhibited from rotating when it is in the locked position. Thus, the user (the driver in this embodiment) can perform rotating operation on the dial member 20, while pushing the dial member 20 toward the panel 12. In the selector unit 10 of this embodiment, for example, when the user rotates the dial member 20 in one direction, the traveling direction of the vehicle 2 is set to the forward direction. On the other hand, when the user rotates the dial member 20 in the other direction, the traveling direction of the vehicle 2 is set to the backward direction.

As shown in FIG. 3 and FIG. 4, the dial member 20 has an operation portion 22 adapted to be gripped by the user, and a base shaft portion 24 that extends from the operation portion 22 through the opening 12h of the panel 12. The radial dimension R22 of the operation portion 22 is larger than the radial dimension R24 of the base shaft portion 24, and the dial member 20 is configured such that the user can easily grip and operate the operation portion 22. The radial dimensions R22, R24 mean dimensions measured from the rotation axis C of the dial member 20 to an outer circumferential surface 20c of the dial member 20. In this connection, the respective radial dimensions R22, R24 of the operation portion 22 and base shaft portion 24 may not necessarily be constant in the circumferential direction. Namely, the cross-sectional shapes of the operation portion 22 and base shaft portion 24 perpendicular to the rotation axis C are not limited to perfect circles.

A portion of the outer circumferential surface 20c of the base shaft portion 24, which is located adjacent to the operation portion 22, provides an inclined surface 24s. The inclined surface 24s is inclined radially outward, namely, the radial distance from the rotation axis C to the inclined surface 24s increases, as the distance from the panel 12 to the inclined surface 24s in the axial direction increases. Also, the inclined surface 24s is opposed to the surface 12a of the panel 12 in the first direction (the vertical direction in this embodiment). Space is provided in the first direction, between the inclined surface 24s of the dial member 20 and the surface 12a of the panel 12, such that the dial member 20, when pushed in, does not interfere with the panel 12. Then, the distance DT from the surface 12a of the panel 12 to the inclined surface 24s of the dial member 20 in the first direction continuously increases as a distance from the opening 12h of the panel 12 increases.

Namely, in the cross-sectional views of the FIG. 3 and FIG. 4, the surface 12a of the panel 12 and the inclined surface 24s of the dial member 20 are not in parallel with each other, but form an angle θ. Although not particularly limited, the angle θ formed by the surface 12a of the panel 12 and the inclined surface 24s of the dial member 20 changes continuously or in steps, in the circumferential direction about the rotation axis C. When the front and rear of the dial member 20 are compared with each other, for example, the angle θ1 on the rear side of the dial member 20 is different from the angle θ2 on the front side of the dial member 20.

Figure 5:
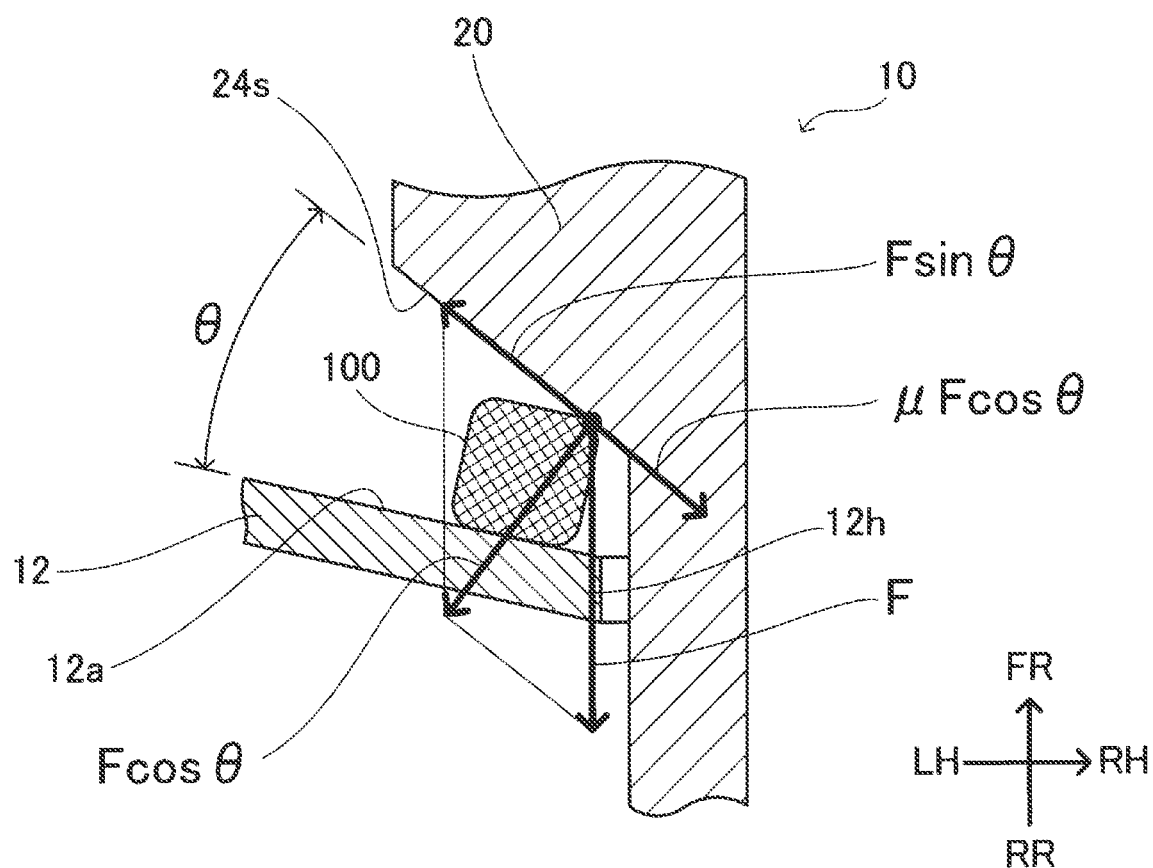
FIG. 5 is a view useful for describing force applied to a foreign object.

As described above, in the selector unit 10 of this embodiment, a local portion of the surface 12a of the panel 12 located adjacent to the dial member 20 has a concave shape. This arrangement makes it easier for the user to operate the dial member 20, while holding down the substantial amount of protrusion of the dial member 20 relative to the panel 12. Meanwhile, foreign objects 100 on the panel are likely to gather toward the dial member 20, as shown in FIG. 5, and any of the foreign objects 100 may enter space between the dial member 20 and the panel 12. In this case, when the user pushes in the dial member 20, the foreign object 100 may be caught between the dial member 20 and the panel 12.

However, in the selector unit 10 of this embodiment, the outer circumferential surface 20c of the dial member 20 includes the inclined surface 24s as described above. The inclined surface 24s is inclined radially outward, namely, the radial distance from the rotation axis C to the inclined surface 24s increases, as the axial distance from the panel 12 to the inclined surface 24s increases. Also, the inclined surface 24s is opposed to the surface 12a of the panel 12 in the first direction (namely, in the direction in which the dial member 20 is pushed in). Then, the distance DT in the first direction from the surface 12a of the panel 12 to the inclined surface 24s of the dial member 20 continuously increases as the distance from the opening 12h increases. Namely, in the cross-sectional views shown in FIG. 3 and FIG. 4, the space between the dial member 20 and the panel 12 has a wedge-like shape, namely, it expands radially outwards. With this arrangement, when the dial member 20 is pushed in toward the panel 12, the foreign object 100 present between the inclined surface 24s of the dial member 20 and the surface 12a of the panel 12 can be pushed out by the inclined surface 24s. Thus, operation on the dial member 20 can be substantially prevented from being disturbed or blocked by the foreign object 100.

As shown in FIG. 5, the force applied from the inclined surface 24s of the dial member 20 to the foreign object 100 depends on the angle θ formed by the surface 12a of the panel 12 and the inclined surface 24s of the dial member 20. For example, where F represents the force with which the dial member 20 is pushed in, the force with which the inclined surface 24s pushes out the foreign object 100 is $F \sin \theta$, and the frictional force applied to the foreign object 100 against the above force is $\mu F \cos \theta$. Accordingly, when the relationship of $F \sin \theta > \mu F \cos \theta$ is satisfied, the foreign object 100 can be expelled from between the dial member 20 and the panel 12. Here, the above parameter μ, is the friction coefficient related to the frictional force applied to the foreign object 100. Accordingly, the lower limit of the angle θ varies according to characteristics, such as the material, shape, and size, of the foreign object 100, which may influence the friction coefficient μ. In this respect, it is not realistic to take account of characteristics of all possible foreign objects 100. Thus, typical foreign objects 100 that can be expected to appear may be determined, and their friction coefficient μ may be specified, so that an angle θ that satisfies the relationship of $F \sin \theta > \mu F \cos \theta$ may be employed. For example, the angle θ may be equal to or larger than 30 degrees, or may be equal to or larger than 45 degrees in another form, or may be equal to or larger than 60 degrees in a further form.

As described above, the selector unit 10 of this embodiment further includes the biasing member 30 that biases the dial member 20 away from the panel 12. Thus, the dial member 20 is normally kept in the locked position, so that the dial member 20 is prevented from being erroneously operated. In addition, with the dial member 20 thus biased toward the locked position, the user can easily perform operation to push in the dial member 20 little by little, or can easily make subtle adjustment of the force with which the dial member 20 is pushed in. Thus, the user can more reliably remove the foreign objects 100 present between the dial member 20 and the panel 12.

While the embodiment of this technology has been described in detail, the details are merely exemplary, and are not meant to limit the appended claims. The technology described in the claims includes those obtained by making various modifications or changes to specific examples illustrated above. The technical elements described in this specification or drawings exhibit technical usefulness alone or in various combinations, and they are not limited to combinations described in the claims as filed. Also, the technology illustrated in this specification or drawings may achieve two or more objects at the same time, and has the technological usefulness by achieving one of the objects.

What is claimed is:

1. A selector unit of a dial type, comprising:
a panel having an opening; and
a dial member that protrudes in a first direction from the opening of the panel, the dial member being configured to be rotated about a rotation axis parallel to the first direction in a condition where the dial member is pushed in toward the panel, wherein:
a surface of the panel includes a concave surface having a depth that increases toward the opening,
the dial member has an operation portion configured to be gripped by a user, and a base shaft portion that extends from the operation portion through the opening of the panel, the operation portion having a larger radial dimension than the base shaft portion,
at least a part of an outer circumferential surface of the base shaft portion is an inclined surface that is inclined radially outward from the panel, the inclined surface being opposed to the surface of the panel in the first direction,
a distance in the first direction from the surface of the panel to the inclined surface of the dial member continuously increases as a radial distance from the opening to the inclined surface increases, and
an angle formed by the surface of the panel and the inclined surface of the dial member on a rear side of the dial member is smaller than an angle formed by the surface of the panel and the inclined surface of the dial member on a front side of the dial member.

2. The selector unit according to claim 1, wherein an angle formed by the surface of the panel and the inclined surface of the dial member changes continuously or in steps, in a circumferential direction about the rotation axis.

3. The selector unit according to claim 1, further comprising a biasing member configured to bias the dial member in a direction away from the panel.

4. The selector unit according to claim 1, wherein:
the dial member is supported such that the dial member is movable in the first direction between a locked position and an unlocked position, where the unlocked position is displaced in a direction toward the panel from the locked position; and
the dial member is inhibited from rotating about the rotation axis when the dial member is in the locked position.

5. The selector unit according to claim 1, wherein:
the selector unit is used for a vehicle; and
the panel is located in the vehicle to provide a part of an interior of the vehicle.

6. The selector unit according to claim 1, wherein the inclined surface is a conical frustum surface and situated opposed to the surface of the panel in the first direction.

7. The selector unit according to claim 1, wherein one of the angle formed by the surface of the panel and the inclined surface of the dial member on the rear side of the dial member, or the angle formed by the surface of the panel and the inclined surface of the dial member on the front side of the dial member is equal to larger than 30 degrees.

* * * * *